(12) United States Patent
Fiorentino et al.

(10) Patent No.: US 11,533,523 B2
(45) Date of Patent: Dec. 20, 2022

(54) INTERCONNECTED SYSTEM FOR HIGH-QUALITY WIRELESS TRANSMISSION OF AUDIO AND VIDEO BETWEEN ELECTRONIC CONSUMER DEVICES

(71) Applicant: Ramon Fiorentino, Santo Domingo (DO)

(72) Inventors: Ramon Fiorentino, Santo Domingo (DO); Miguel Delgado, Santo Domingo (DO)

( * ) Notice: Subject to any disclaimer, the term of this patent is extended or adjusted under 35 U.S.C. 154(b) by 0 days.

(21) Appl. No.: 16/620,084

(22) PCT Filed: Dec. 13, 2017

(86) PCT No.: PCT/DO2017/050001
§ 371 (c)(1),
(2) Date: Dec. 6, 2019

(87) PCT Pub. No.: WO2019/114911
PCT Pub. Date: Jun. 20, 2019

(65) Prior Publication Data
US 2020/0213634 A1    Jul. 2, 2020

(51) Int. Cl.
*H04N 21/238* (2011.01)
*H04N 21/242* (2011.01)
*H04W 4/06* (2009.01)

(52) U.S. Cl.
CPC ......... *H04N 21/238* (2013.01); *H04N 21/242* (2013.01); *H04W 4/06* (2013.01)

(58) Field of Classification Search
CPC ...... H04N 21/238; H04N 21/242; H04W 4/06

USPC ....................................................... 725/116
See application file for complete search history.

(56) References Cited

U.S. PATENT DOCUMENTS

| 6,678,215 | B1 | 1/2004 | Treyz et al. |
| 6,816,904 | B1* | 11/2004 | Ludwig ................. H04M 3/567 348/E7.081 |
| 2005/0210101 | A1 | 9/2005 | Janik |
| 2007/0250872 | A1 | 10/2007 | Dua |
| 2008/0235733 | A1* | 9/2008 | Heie .................. H04N 7/17318 725/46 |
| 2009/0052144 | A1* | 2/2009 | Martich ................ H04N 7/108 361/728 |

(Continued)

FOREIGN PATENT DOCUMENTS

| ES | 2253968 B1 | 7/2007 |
| ES | 2354079 T3 | 3/2011 |

(Continued)

*Primary Examiner* — Dominic D Saltarelli
(74) *Attorney, Agent, or Firm* — Hoglund & Pamias, PSC; Roberto J. Rios

(57) ABSTRACT

The proposed solution aims to describe the functionality, interconnection and application fields of a system that allows the transmission of audio and video between sending and receiving devices, wirelessly to a decoding and playback terminal, eliminating physical cables, their characteristics could vary from model to model and from manufacturer to manufacturer, due to the immense variety of work methods, assembly, hardware, software and the like that could be included or eliminated in order to achieve a stable, synchronous transmission, with minimal losses and that enable the interconnection of as many equipment as necessary.

10 Claims, 3 Drawing Sheets

(56) References Cited

U.S. PATENT DOCUMENTS

2016/0197783 A1\* 7/2016 Hort .................... H04L 41/0809
　　　　　　　　　　　　　　　　　　　　　709/222
2016/0309213 A1　10/2016 Du et al.
2018/0288723 A1\* 10/2018 Cai ......................... H04J 13/18

FOREIGN PATENT DOCUMENTS

ES　　　　2376213 B2　8/2012
MX　　2013002574　　9/2014

\* cited by examiner

INTERCONNECTED SYSTEM FOR HIGH-QUALITY WIRELESS TRANSMISSION OF AUDIO AND VIDEO BETWEEN ELECTRONIC CONSUMER DEVICES

FIELD OF THE INVENTION

The present innovation relates to devices commonly known as consumer electronics, in particular to an interconnected system for the wireless transmission of high-quality audio and video among consumer electronic devices.

BACKGROUND OF THE INVENTION

Having detected the possibility of implementing the proposed system, it is necessary to investigate the previous technologies, seeking further advantages for consumers that could result from the application of this innovation, as well as the inventions and applications already existing worldwide in this regard.

The application ES2253968 to Vision Relax, published on Jun. 1, 2006, proposes a device that enables the visualization of previously stored images on a physical medium and that must be reproduced from a decoder. The visualization of images is carried out in a device similar to glasses which also has integrated headphones, remote control and elastic characteristics that point to a comfortable and ergonomic experience by the end users. The patent application document also makes reference to proprietary program code and applications developed on the Linux platform.

Patent application US2016/0309213 to Shenzhen TCL New Technology Co. published on Oct. 20, 2016, refers to a method of synchronization of audio/video signals that includes: acquiring a delay data value of an audio signal formed by a wireless module of an audio/video signal synchronization device and a wireless audio device; According to a display format of a video data to be reproduced, calculate the playing time of each frame of the video data to be reproduced; According to the delay data value and the reproduction time of each frame, calculate the number of frames to be stored in buffer memory, and generate and store in the buffer memory the frames with the corresponding number; And according to an audio/video playback instruction, reproduce the buffered frames and video data to be played sequentially, and transmit audio data corresponding to the video data that will be reproduced to the wireless audio device for audio data playback while playing frames. An audio/video signal synchronization apparatus is also described.

In a way similar to that described in the previous paragraph, it is constituted the patent ES2376213 to Telefonica SA, published on Dec. 3, 2012. In which the procedure is stated by which the distribution of audio and video signals for wireless mechanisms in indoor environments using DVB-T signals in the 5 GHz spectrum would be possible. This invention, as stated in the same patent applies directly to the construction and deployment of communication networks and their connection with other networks, not being the same limited to equipment within the so-called mass consumption electronics.

Patent ES2354079 to QUALCOMM INC, published on Mar. 9, 2011, states an alternative method for synchronizing wireless audio and video signals. In this case, the claims again focus on alternative methods for synchronizing audio and video data by providing coding, decoding, buffering and transfer control characteristics typical of common RTP signals in content distribution applications.

Patent MX213002574 to RAMDEO PRADEEP, published ON Sep. 16, 2014, presents the invention of a system that includes a wireless camera for generating audio and video feeds by a first person, while a second person, looks at the audio and video feeds through a device with internet access, located in a different geographical position.

Patent MX2007002295 to QUALCOMM IN, dated Nov. 5, 2007, presents an optimization method for the transmission of audio and video data in wireless systems. This application focuses mainly on the video conferencing sector that involves several people and that during the transmission the audio and video data of one of the interlocutors must be sent to all other participants based on the selections made by computer programming stored within a server that determines the speaker by predefined criteria.

The PCT patent WO2006/073863 to INTEL CORP+, published on Jul. 13, 2006, is categorized within the field of multicast transmissions, specifically within the improvement of existing methods, where different characteristics of a transmission system for multimedia content are outlined that could involve various existing devices such as memories of various types, personal computers, personal digital assistants and personal communication systems including cell phones. Within this context, the creation of an RMA (Reliable Multicast Agent) is crucial in order to increase the reliability and robustness of the link, thus seeking to ensure minimum losses in the eventual receiver-sender transmission.

Having explored all these aspects already registered, it is evident that this system provides in itself a substantial advance regarding the interconnection capacity between consumer electronics, its relationship with the end user through graphic tools on the television or monitor; as well as the ability to be multiplexed between each other providing comfort and flexibility to everyday applications.

SUMMARY OF THE INVENTION

The described device enables the transmission of audio and video between sending and receiving devices, given that an exponential increase in access to such technologies has been registered draws attention that the interconnection characteristics have not advanced significantly in regard to traditional methods.

By applying the present system, is sought to update and improve the current devices specifically for their characteristics of audio and video (I-A/V) interconnection and transmission characteristics. Thus being, a conventional consumer electronics reproduction or decoding equipment equipped with the transmission system; constituting an I-A/V transmitter which can be interconnected with another conventional consumer electronics device called the I-A/V receiver.

Typically, for applications of this type the I-A/V receiver will be a conventional television which has been equipped since its manufacture with wireless technology that allows it to be interconnected with a wide variety of I-A/V emitting equipment which can also be equipped with the present transmission system since its assembly and manufacturing phase.

In addition, and taking advantage of the processing capabilities of the I-A/V receiver equipment, the possibility of interrelating these functionalities at a graphical level is conceived.

That is, users can choose directly on their television screens whether or not they want to use said wireless system for interconnection. Following this line of development, it is understandable that a same user would like to have several I-A/V emitting devices connected to the same I-A/V receiver, for which, by multiplexing such choice would be possible within the same 1-A/V receiver.

It is currently well known that wireless technologies for audio/video transmission have advanced significantly, however the traditional physical methods of link and transmission remain the default option for manufacturers of consumer electronics. The present proposal aims to be a first step towards the final elimination of the cables that are currently used to make the transmission of audio/video signals between devices that read/decode/transmit to others that normally function as receivers with all the steps and stages that this may imply.

However, the present solution does not have as an objective the elimination of the physical cables dedicated to the electrical supply of the different devices but implementing a method of wireless interconnection for the replacement of certain common physical wiring existing between devices classified within the so-called Consumer Electronics.

Such devices which include but are not limited to televisions, electronic entertainment systems, multimedia playback units, personal and industrial computers and cable signal coding terminals which normally include a physical means such a cable made of metallic material which extends from the device that originates the signal to the device that receives it, decodes, processes and transmits to the end user, usually by means of a screen which can be a Plasma, LCD or backlit light-emitting diodes (LED technology) type.

Another objective of the present application is the provision of a transmission system that can be applied to a range of manufacturers which, for simplicity, replicability, interconnection capacity, as well as low cost can be implemented in a variety of electronic equipment as mentioned in the previous paragraph.

Another objective of the present application is to provide an interconnection method that is easy to use by end users, which should not interact directly with the components dedicated to audio and video transmission either in the form of radio frequency waves or datagrams, bits or any other form/specification of wireless transmission.

Similarly, another objective of the present application is the mass elimination of traditional methods for transmitting audio/video signals within the field of consumer electronics. This, by implementing a safe method, not subject to common interference, whereby end users have a new experience of installing and using the devices within the category of consumer electronics which would have from their assembly phase dedicated components for the transmission and reception, so that they can be interconnected easily, inexpensive and without external physical cables.

BRIEF DESCRIPTION OF THE DRAWINGS

The drawings are presented by way of illustration and not limiting the present application. The figures in the drawings are briefly described as follows.

REFERENCE NUMBERING

100—Electronic consumer device
110—I-A/V transmitter device
111—Audio and video fed from an I-A/V device
112—I-A/V Receiver Device
113—Audio and video processed and displayed by the I-A/V receiver
120—Printed circuit board
121—I-A/V transmitter
122—I-A/V Transmitter power supply
123—Output signal sent wirelessly
124—Usual components typical of the usual operation of the transmitting device
130—Printed circuit board
131—I-A/V receiver
132—I-A/V receiver power supply
133—Audio and video input signal received wirelessly
134—Additional components typical of the usual operation of the receiver device
140—End user
141—Device equipped with I-A/V transmitter
142—Device equipped with I-A/V receiver
143—Images displayed on I-A/V receiving equipment
150—Selection options for the use of wireless reception
151—Television remote control

DETAILED DESCRIPTION OF THE INVENTION

Figure 1:
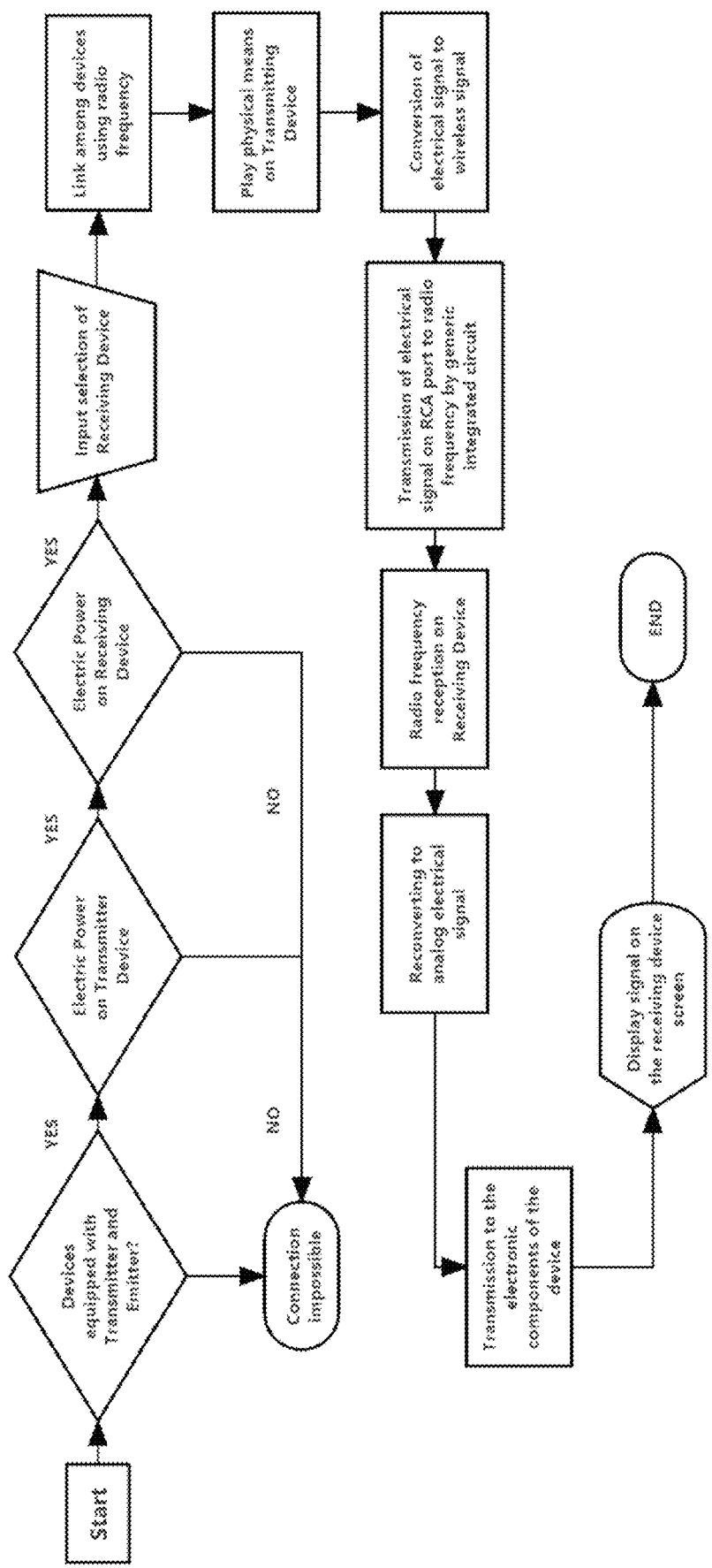
FIG. 1: Shows the block diagram of the present utility application.

FIG. 1: The block diagram shown represents the operation of the present application while providing information on the possible interaction with its users. In the first steps of the block, it is verified whether both devices considered; sender and receiver, have the necessary components to establish a wireless link and if both are electrically powered.

This main power supply of the consumer electronics device; is the one that provides supply for the operation of the circuitry that is integrated into the consumer electronics apparatus since its assembly phase.

The user then proceeds to select that the input to be used, on the receiving device, is the one associated with the sending device. This operation must be done manually and would depend on the default options of the receiving device. As soon as this selection has been made, the link between the sending device and the receiver is made possible; so that if necessary, it is possible to immediately start the reproduction of the physical medium that could be reproduced by the device equipped with transmitter.

The signal reproduced and flowing through the main circuit board to the RCA outputs, is converted to its wireless form and transmitted by radio waves at a frequency that can range between 2.8 and 6.0 MHz. The electrical video signal can also be accompanied by audio signals, which will be transmitted from its corresponding port, and both received wirelessly in the device that will play them for the enjoyment of the users.

The received signal is then re-converted and fed to the corresponding input, for further processing and play.

Figure 2:
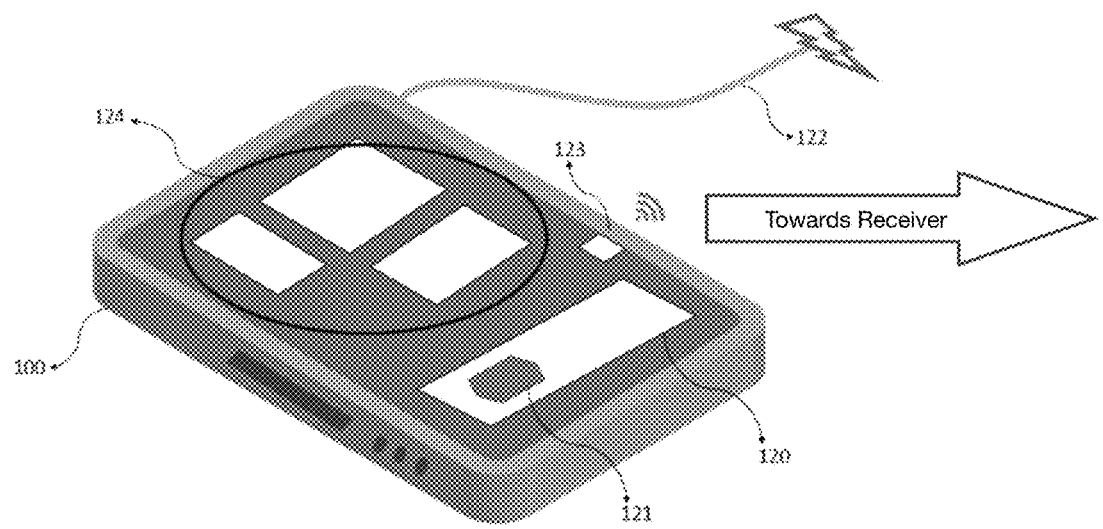
FIG. 2: Shows the interior of a device equipped with a wireless transmitter (Emitter IA/V).

In FIG. 2, a consumer electronics apparatus (100) is shown which could be, but not limited to: a media player, entertainment system, video game system, common cable television signal decoding terminal which is electrically powered (122) and has its own common operating components (124) in which has been integrated an I-A/V transmitter device (121) included in a printed circuit board (120) (since its assembly phase) capable of taking the electrical signal that flows through physical means towards the output port of any of the aforementioned devices, and transmitting it wirelessly (123) to the I-A/V type signal receiver device (131).

Figure 3:
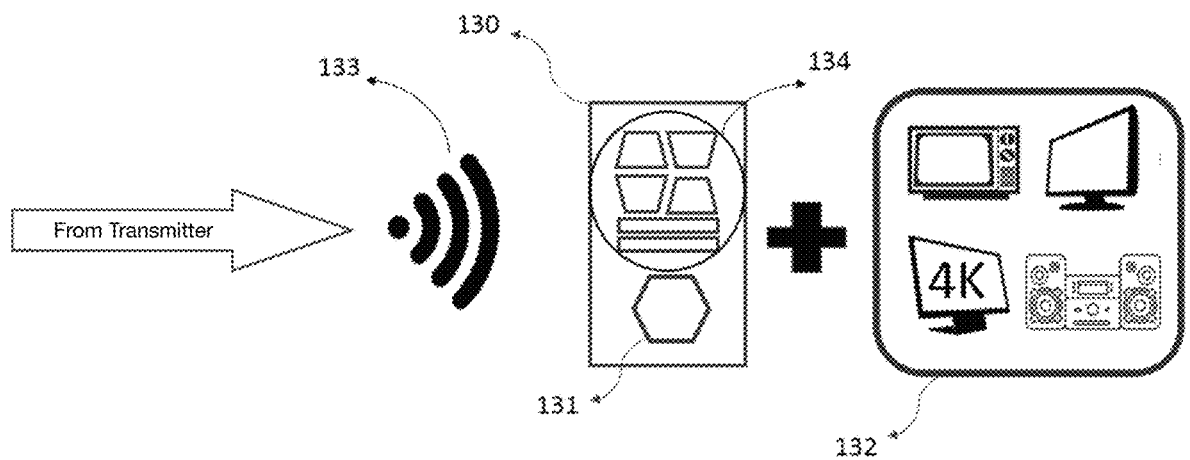
FIG. 3: Diagram of a device equipped with a wireless receiver (Receptor IA/V).

FIG. 3 shows an electrically powered apparatus (132) capable of displaying images and/or sounds which can be, but not limited to: computer monitor, a smart television, a conventional CRT television or a sound system, in which has been integrated (since its assembly phase) a receiver device of I-A/V type (131) interconnected by physical means to a printed circuit board (130) capable of taking wireless signals (133) and feed them to the input port where, by physical means and electronic components (134) will be treated and subsequently played either by in screen of the device or speakers, in the case of only sounds.

Figure 4:
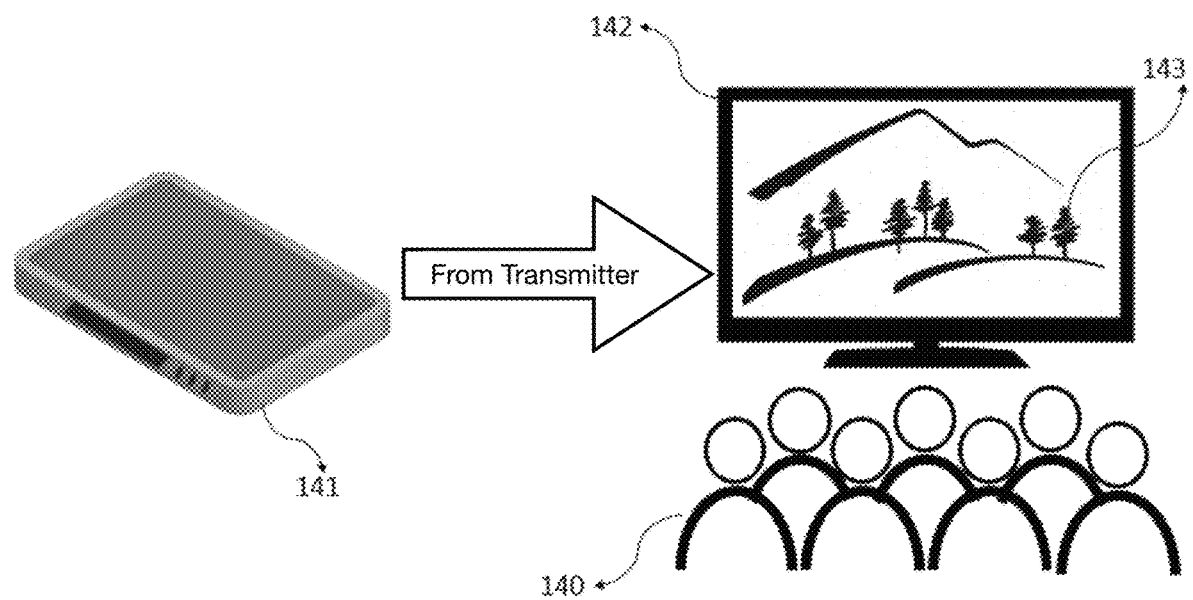
FIG. 4: Shows a perspective view of a user when using devices equipped with wireless transmitters and receivers.

In FIG. 4, a person or group of people, identified as end users (140) are located adjacent to the apparatus that includes the I-A/V reception device (142) to enjoy the visual or auditive experience of educational content, entertainment, personal or professional that is being played (143) on the screen or speaker and that are originated from an apparatus equipped with an I-A/V transmitter (141).

Figure 5:
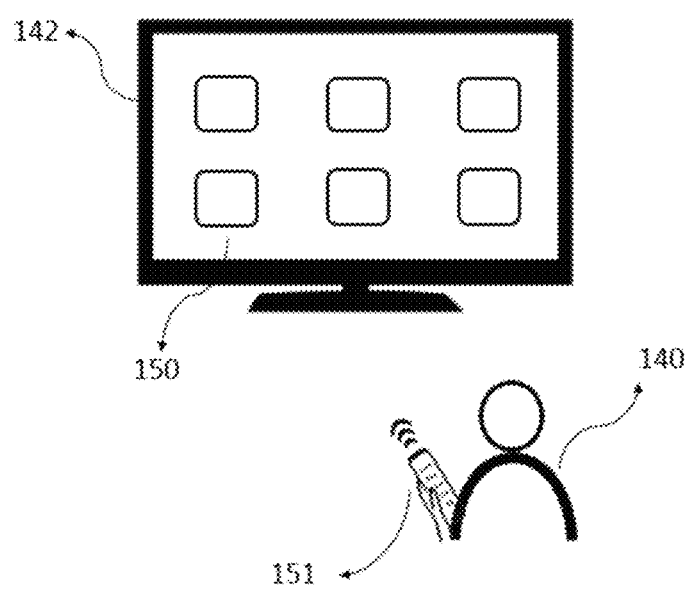
FIG. 5: Shows a user interacting by selecting the wireless transmission option in a device provided with a screen.

FIG. 5 shows a user (140), assisted by a remote control (151), interacting with a device equipped with an I-A/V receiver (142), which allows to enable or disable the wireless transmission functions and/or choose the input port just as if a conventional physical input (150) was being used.

The invention claimed is:

1. An interconnected system for the wireless transmission of high-quality audio and video among consumer electronics devices comprising:

an electronic wireless transmission module incorporated into a printed circuit board provided inside a main housing of a consumer electronic device configured to generate at least one of an electrical audio signal or an electrical video signal, said consumer electronic device includes at least one wired output port that outputs said at least one of an electrical audio signal or an electrical video signal flowing through an electrically conductive path connected to said at least one wired output port, said electronic wireless transmission module takes said at least one of electrical audio signal or electrical video signal from the electrically conductive path directly coupled to said at least one wired output port and wirelessly transmits said electrical audio signal or said electrical video signal through an integrated antenna.

2. The interconnected system according to claim 1, wherein said at least one of electrical audio signal or electrical video signal is wirelessly transmitted by said integrated antenna in a spectrum between 2.8-6.0 GHz.

3. The interconnected system according to claim 1, wherein said electronic wireless transmission module is powered by said consumer electronics device.

4. The interconnected system according to claim 1, further comprising a module for synchronizing at least one of an audio or video signal between consumer electronics devices, as well as at least one of an order, duration, or volume of the synchronized at least one of an audio or video signal.

5. The interconnected system according to claim 1, wherein said at least one of an electrical audio signal or an electrical video signal is an analog signal or a digital signal.

6. An interconnected system for the wireless transmission of high-quality audio and video among consumer electronics devices comprising:

an electronic wireless reception module incorporated into a printed circuit board provided inside a main housing of a consumer electronic device configured to reproduce at least one of an electrical audio signal or an electrical video signal received a wired input port of said consumer electronic device, said received at least one of an electrical audio signal or an electrical video signal being transmitted from said wired input port through an electrically conductive path for reproduction on said consumer electronic device, wherein said electronic wireless reception module receives on an integrated antenna at least one of a wireless audio signal or a wireless video signal, converts said received at least one of a wireless audio signal or a wireless video signal into a respective converted electrical audio signal or converted electrical video signal and transmits said converted respective electrical audio signal or converted electrical video signal into said electrically conductive path directly coupled to said wired input port for reproduction on said consumer electronic device.

7. The interconnected system according to claim 6, wherein said wireless audio signal or said wireless video signal is wirelessly transmitted in a spectrum between 2.8-6.0 GHz.

8. The interconnected system according to claim 6, wherein said electronic wireless reception module is powered by said consumer electronics device.

9. The interconnected system according to claim 6, further comprising a module for synchronizing at least one of an audio or video signal between consumer electronics devices, as well as at least one of an order, duration, or volume of the synchronized at least one of an audio or video signal.

10. The interconnected system according to claim 6, wherein said at least one of an electrical audio signal or an electrical video signal is an analog signal or a digital signal.

* * * * *